W. Stickney,
Bed Bottom,
N°. 67,604. Patented Aug. 6, 1867.

Witnesses.
F. Lehmann
Jno. A. Ellis

Inventor
W. Stickney
per
T. H. Alexander & Co.
atty

United States Patent Office.

WASHINGTON STICKNEY, OF LOCKPORT, NEW YORK.

Letters Patent No. 67,604, dated August 6, 1867.

---

IMPROVED BED-BOTTOM.

---

*The Schedule referred to in these Letters Patent and making part of the same.*

---

TO ALL WHOM IT MAY CONCERN:

Be it known that I, WASHINGTON STICKNEY, of Lockport, in the State of New York, have invented certain new and useful improvements in Bed-Bottoms; and I do hereby declare that the following is a full, clear, and exact description of the same, reference being had to the accompanying drawings, and to the letters of reference marked thereon, in which—

Figure 1:
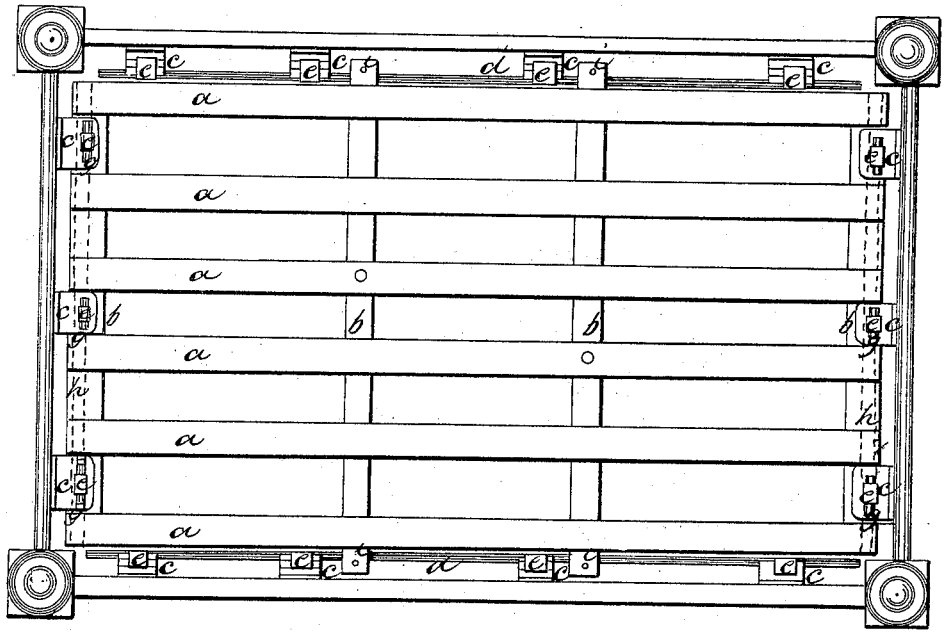

Figure 1 is a plan view, and

Figure 2:
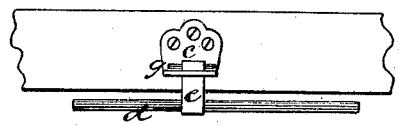

Figure 2 a view showing more fully one of the side rods upon which the bottom rests.

The nature of my invention consists in the peculiar manner of suspending a bed-bottom for the purpose of combining economy and simplicity with all of the desirable qualities possessed by the old spring-bottom bed. And to enable others skilled in the art to make and use it, I will now proceed to describe its mode of construction.

$a\ a\ a$ represent the longitudinal, and $b\ b\ b$ the transverse slats which form the bed-bottom. $c\ c\ c$ are metal supports bent at right angles, and secured to the sides of the bedstead by means of screws. These supports or brackets are provided with a slot, the object of which will be more fully seen hereafter. $d\ d$ are two rods upon which the transverse bars $b\ b\ b$ rest. $e\ e$ are India-rubber loops. Said loops pass through slots in brackets $c\ c\ c$, and are retained therein by means of keys $g\ g$. $h\ h$ represent two rods, designated by red lines, fig. 1, which serve the same purpose beneath the bottom as the keys $g\ g$ do above it. $i\ i$ represent pins which pass through the transverse bars $b\ b\ b$ for the purpose of preventing the bottom from slipping off the rods $d\ d$. Thus it will be seen a most pleasant, simple, and economical bed-bottom is formed. This arrangement may be applied with advantage to both saddles, sofas, and steamboat berths.

What I claim, and desire to secure by Letters Patent, is—

The brackets or supports $c\ c\ c$, India-rubber loops $e\ e$, keys $g\ g\ g$, rods $h\ h$ and $d\ d$, in combination with a bed-bottom constructed substantially in the manner and for the purpose herein set forth and described.

In testimony that I claim the foregoing as my own, I hereby affix my signature in the presence of two witnesses.

WASHINGTON STICKNEY.

Witnesses:
HENRY BOUGHTON,
GEO. W. BOUGHTON.